Jan. 19, 1954     J. B. ATTIG     2,666,265
GAUGE
Filed Aug. 18, 1949     2 Sheets-Sheet 1
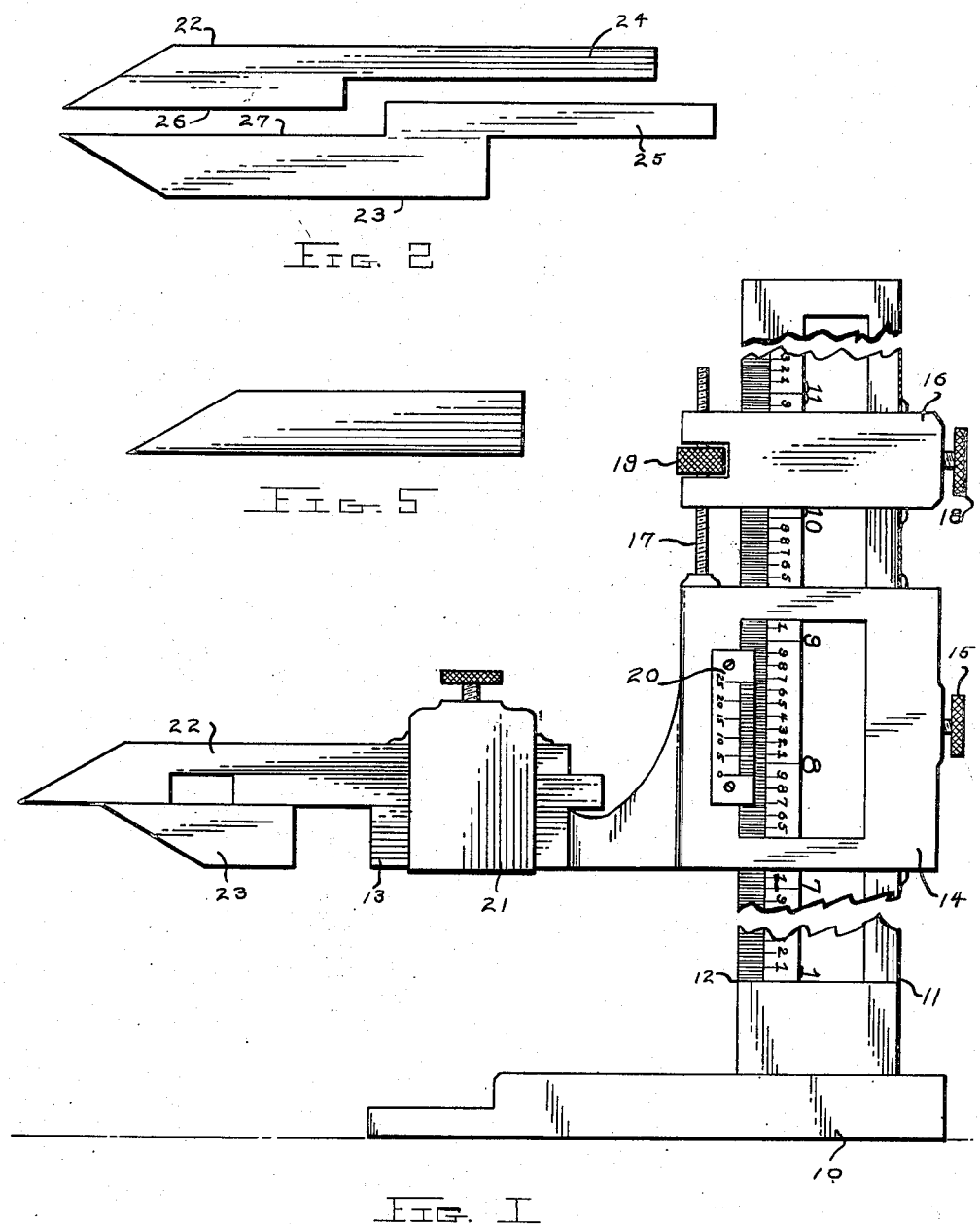

Jan. 19, 1954  J. B. ATTIG  2,666,265
GAUGE

Filed Aug. 18, 1949  2 Sheets-Sheet 2

INVENTOR
John B. Attig
BY
ATTORNEY

Patented Jan. 19, 1954

2,666,265

UNITED STATES PATENT OFFICE 2,666,265

GAUGE

John B. Attig, Bridgeport, Conn.

Application August 18, 1949, Serial No. 110,961

8 Claims. (Cl. 33—169)

This invention relates to gages, and particularly to a new and improved scribing attachment for a vernier height gage.

Prior-known gages of this sort include a standard, reversible scribing element having two parallel surfaces joined by an inclined surface forming a scribing edge. This standard element cooperates with the scale of the gage to give a direct reading from a datum, or layout table, on which it and the work to be marked or measured rests only when employed in one of its positions of use. The standard scribing element, when used with its longest parallel surface facing downwardly, effects a direct reading from datum, but is useful only when there is no part of the work directly above the line to be scribed within a distance equal to the thickness of the element which would interfere with the element. When such is the case, the standard element must be reversed and this results in an erroneous reading from datum on the scale, which error must be taken into consideration each time such a measurement is made.

The principal object of this invention is to provide a scribing means that can be used with standard vernier height gages and still give a direct reading from datum under all conditions of use; the provision of such a scribing means in which a line may be scribed, or a measurement made on work, regardless of the presence of interfering portions of the work, and still in every case give a direct reading on the scale of the gage; the provision of a pair of cooperating elements, the combined thickness of the shanks of which equals that of the standard scribing element commonly employed with height gages, and which pair of elements is so designed that its use with a standard height gage gives direct readings from datum in all positions of use; and the provision of a pair of scribing elements which provides a scribing edge at the same elevation regardless of the element employed.

The above, as well as other objects and novel features of the invention will become apparent from the following specification and accompanying drawings, in which:

Figure 1 is an elevational view of a vernier height gage to which the principles of the invention have been applied;

Fig. 2 is a view of the pair of scribing elements to which the principles of the invention have been applied;

Fig. 5 is a view of a standard scribing element in current use.

Figure 3:
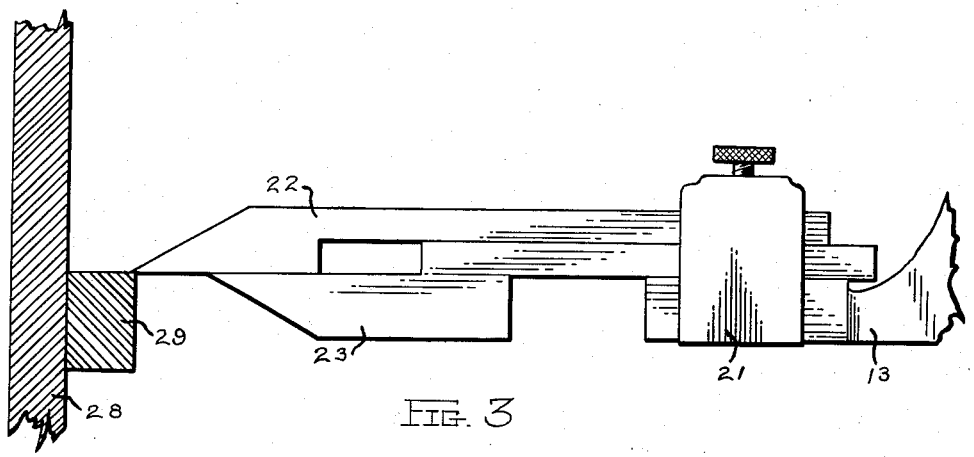
Fig. 3 is a view of the scribing elements in one position of use.

Referring to Fig. 1, the principles of the invention are shown as applied to a standard vernier height gage including a base 10 adapted to be placed upon a datum surface, or work layout table. A standard 11 is rigidly attached to base 10 at right angles thereto.

A scale 12 is provided along the one edge of the standard 11 for a purpose to be described. An arm 13 having a saddle portion 14 is slidingly mounted on standard 11 and is adapted to be secured thereto at any desired position by a screw 15. A vernier slide 16 is attached to standard 11 above saddle 14 and is connected to the latter through the usual vernier screw 17. It is adapted to be secured to the standard 11 by a screw 18. With screw 15 loose, saddle 14 can be adjusted very accurately by rotating nut 19 in the usual manner. A vernier scale 20 is attached to the saddle 14 in cooperating position with the scale 12.

Figure 4:
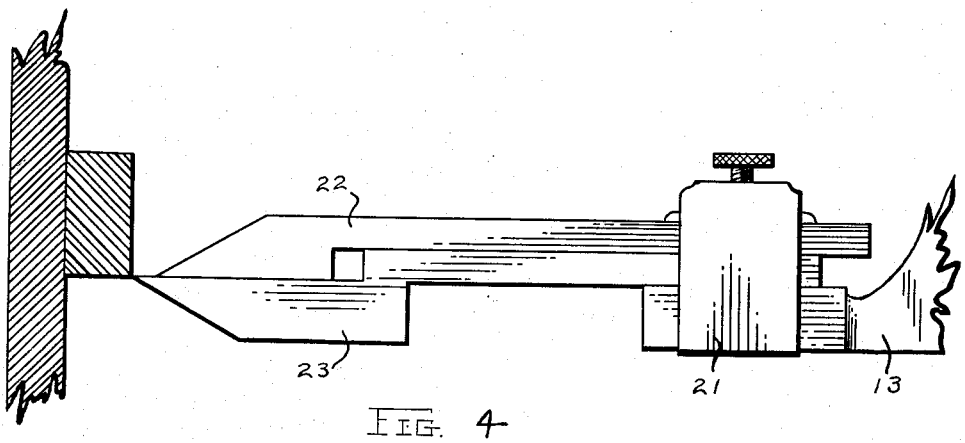
Fig. 4 is a view of the scribing elements in another position of use.

With the arm 13 in its lowest position, the "0" of the vernier scale 20 will correspond to a reading of 1.000 inch on the scale 12. The thickness of arm 13, plus the thickness of base 10 equals one inch. Accordingly, with arm 13 in its lowest position and the standard element of Fig. 5 attached to arm 13 by a saddle clamp 21, with its longest parallel side down as shown in Fig. 5, the scribing edge of the standard element is 1.000 inch above datum. However, the standard element is not useful in this position to scribe or measure a work piece arranged as shown in Fig. 4, in which case the standard element must be reversed, making the actual elevation ½ inch more than in the previous case, so that a ½-inch error is introduced into the reading of scale 12.

Referring to Fig. 2, a pair of cooperating scribing elements 22 and 23 is shown. These elements are provided with shanks 24, 25 having the same thickness and the combined dimensions of which exactly equal ½ inch—that of the standard element of Fig. 5. The surfaces 26 and 27 of the elements 22, 23 are off-set an amount such that when in their assembled relation and clamped to arm 13 by saddle clamp 21, the mating surfaces 26, 27 are coextensive with the top surface of arm 13. Each surface 26, 27 may be provided with an insert at its cutting end of a hard metal alloy such as tungsten carbide or its equivalent. Accordingly, with arm 13 in its lowest position, the scribing edges of elements 22 and 23 will be 1.000 inch above datum—the direct reading of scale 12.

Referring to Fig. 3, it is obvious that work 28 having a portion 29 directly beneath the elevation to be scribed or measured presents no problem since element 23 is retracted and element 22 employed. Also, as shown in Fig. 4, the reverse arrangement presents no problem since element 22 is retracted and element 23 employed. In every case, it is evident also that the elevation of the scribed line or measurement is directly read from scale 12.

Although the various features of the improved vernier height gage have been shown and described in detail to fully disclose one embodiment of this invention, it will be evident that numerous changes may be made in such details, and certain features may be used without others, without departing from the principles of the invention.

What is claimed is:

1. In a height gage having a base, a standard having a scale thereon, and an arm slidingly mounted on said standard, the combination with said arm of scribing means adapted to produce a line, or measurement, on work as a direct reading from datum on said scale, said scribing means including a pair of assembled scribing elements having scribing edges lying in a common plane; and shank portions for said elements, the outer surface of one of which, when said elements are in assembled relation, lies in said common plane.

2. Scribing means for a height gage comprising a pair of mating scribing elements adapted when combined to provide a scribing edge lying in a common plane; and shank portions for said elements, the outer surface of one of which, when said elements are in assembled relation, lies in said common plane.

3. In a height gage having a base, a standard having a scale thereon, and an arm slidingly mounted on said standard, said arm having a surface bearing a direct relation with a datum, the combination with said arm of a pair of mating scribing elements adapted when combined to provide a pair of scribing edges in the same plane, and shank portions for said elements, the outer surface of one of which, when said elements are in assembled relation, lies in said plane and is adapted to be clamped in contact with said arm along its surface that bears a definite relation to datum.

4. Scribing means for height gages comprising a pair of mating elements adapted to be clamped to the arm of a gage, each of said elements having a scribing edge lying within the same plane, one of said mating elements having a recessed shank portion and the other having an off-set shank portion such that when said elements are assembled, the outer surface of one of said shanks lies in the plane of the scribing edges.

5. In a height gage, a base; a standard; an arm slidably mounted on said standard having a supporting surface on which scribing or measuring means is adapted to be clamped; a scale located on said standard so that the supporting surface of said arm cooperates with said scale to give a direct reading from a datum on which said base is mounted; a pair of opposed mating elements having scribing or measuring means lying within a common plane; and shanks for said elements, the outer surface of one of which, when said elements are in assembled relation, lies in said common plane and is adapted to be clamped to the supporting surface of said arm.

6. In a height gage, a base; a standard; an arm slidably mounted on said standard having a supporting surface on which scribing or measuring means is adapted to be clamped; a scale located on said standard so that the supporting surface of said arm cooperates with said scale to give a direct reading from a datum on which said base is mounted; and a pair of mating scribing elements adapted to be moved relatively to each other and to be clamped to the supporting surface of said arm and adapted when assembled to provide two scribing edges in the same plane, one of said elements having a recessed shank portion and the other having an off-set shank portion such that when assembled, the outer surface of one of said shanks lies in the plane of the scribing edges.

7. In combination, a standard; a vertically slidable arm on said standard; a clamping sleeve on said arm; and a pair of upper and lower scribers extending through said clamping sleeve, said scribers being in contact with their facing sides in sliding engagement, said scribers terminating at one end in scratch points, said scribers being arranged for longitudinal adjustment relative to each other and to the clamping sleeve wherein the point of one of the scribers extends outwardly beyond the point of the other scriber and said other scriber serves as a slide block and leveller for said one scriber.

8. In combination, a standard; a vertically slidable arm on said standard; a clamping sleeve on said arm; and a pair of upper and lower scribers extending through said clamping sleeve, said scribers being in contact with their facing sides in sliding engagement, said scribers terminating at one end in scratch points, said scribers being arranged for longitudinal adjustment relative to each other and to the clamping sleeve wherein the point of one of the scribers extends outwardly beyond the point of the other scriber and said other scriber serves as a slide block and leveller for said one scriber, the scratch points of the scribers being formed by bevels reaching to the outer ends of the scribers, the bevels of the scribers being reversed with respect to each other.

JOHN B. ATTIG.

References Cited in the file of this patent

UNITED STATES PATENTS

| Number | Name | Date |
|---|---|---|
| 1,103,265 | Corff | July 14, 1914 |
| 1,230,627 | Thompson | June 19, 1917 |
| 2,087,600 | Knoblauch | July 20, 1937 |
| 2,252,146 | Walsh | Aug. 12, 1941 |
| 2,325,558 | Uslan | July 27, 1943 |
| 2,335,513 | Hewitt | Nov. 30, 1943 |

FOREIGN PATENTS

| Number | Country | Date |
|---|---|---|
| 395,514 | Great Britain | July 20, 1933 |